Figure 1:
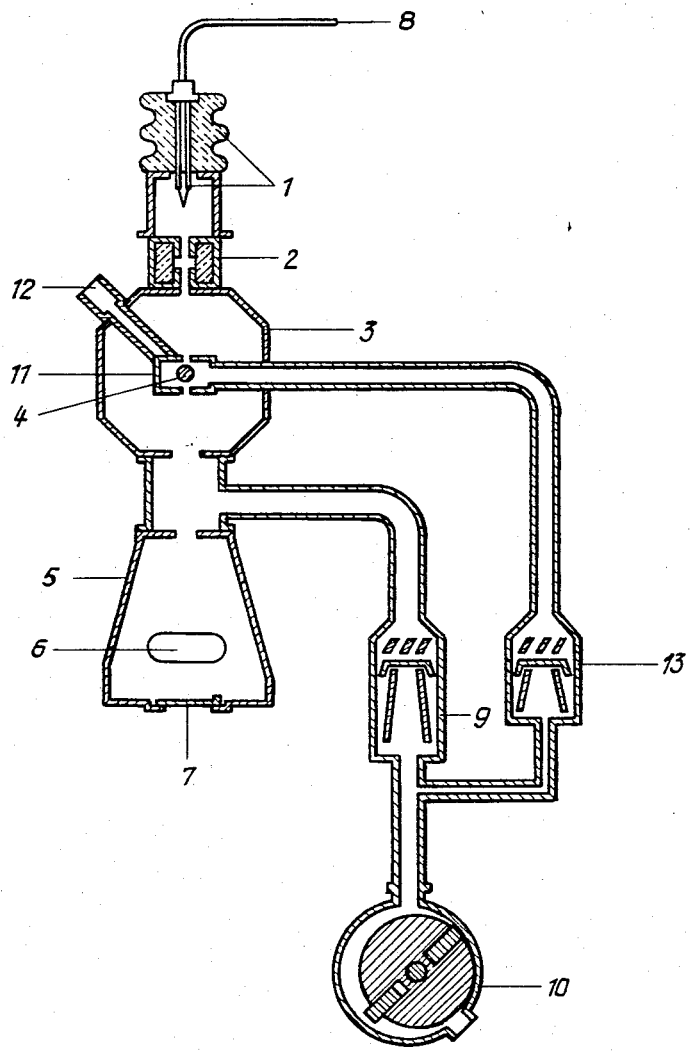

United States Patent Office 3,363,098
Patented Jan. 9, 1968

3,363,098
COMBINED ELECTRON MICROSCOPE AND DIFFRACTION APPARATUS FOR THE ELECTRON-OPTICAL INSPECTION OF THE SURFACES OF OBJECTS
Lienhard Wegmann, Zurich, Switzerland, assignor to Balzers Patent- und Lizenz-Anstalt, Balzers, Liechtenstein
Filed Sept. 9, 1964, Ser. No. 395,222
Claims priority, application Switzerland, Sept. 18, 1963, 11,489/63
10 Claims. (Cl. 250—49.5)

This invention relates to apparatus for the electron-optical inspection of the surfaces of objects, and in particular to electron diffraction apparatus.

Electron diffraction apparatus is well known in which an electron beam is directed onto the surface of an object in a vacuum, generally at near-grazing incidence, the resulting diffraction of the beam providing information about the object. It is often desirable that the surface should also be observed more directly, in order to ascertain its topography and to enable the electron beam to be brought onto a desired part of the surface. This can be done by a light microscope attached to the diffraction apparatus. At room temperature the objective of the light microscope can be brought close to the object and resolution is therefore good. However electron diffraction is often used for the inspection of heated objects at temperatures of up to 1500 or 2,000° C. At these temperatures the objective of the light microscope must have a greater distance from the heated object surface and the resolution of the light microscope is thereby restricted to 1 or more.

The use of an electron emission microscope would be advantageous to enable the surface to be observed with a good degree of definition even at a high temperature. The electrons could be emitted thermally or by the electron beam to be diffracted. But two principal difficulties arise. Firstly, the electron beam to be diffracted causes contamination of the object; secondly, in the electron diffraction camera the object is at ground potential, while it is at a high voltage in known electron emission microscopes. Thus either the housing of the diffraction apparatus or that of the microscope must be brought to a high voltage, which prevents rational operation.

It is therefore an object of the present invention to permit the emission microscope observation of a preparation during examination by electron diffraction.

The present invention contemplates apparatus for the electron-optical examination of an object, including an electron diffraction apparatus having a diffraction chamber housing within which the said object can be supported in a vacuum for examination by electron diffraction, and an electron emission microscope disposed for examination of the surface of said object and having an anode, an anode screen, a fluorescent screen and a projective, said anode, anode screen, fluorescent screen and at least part of said projective being maintained at a high positive potential relative to said housing, a housing surrounding said emission microscope and electrically connected to said diffraction chamber housing, at least one viewing window in the emission microscope housing, and at least one insulated high-voltage duct penetrating said emission microscope housing for supplying said high potential.

Figure 2:
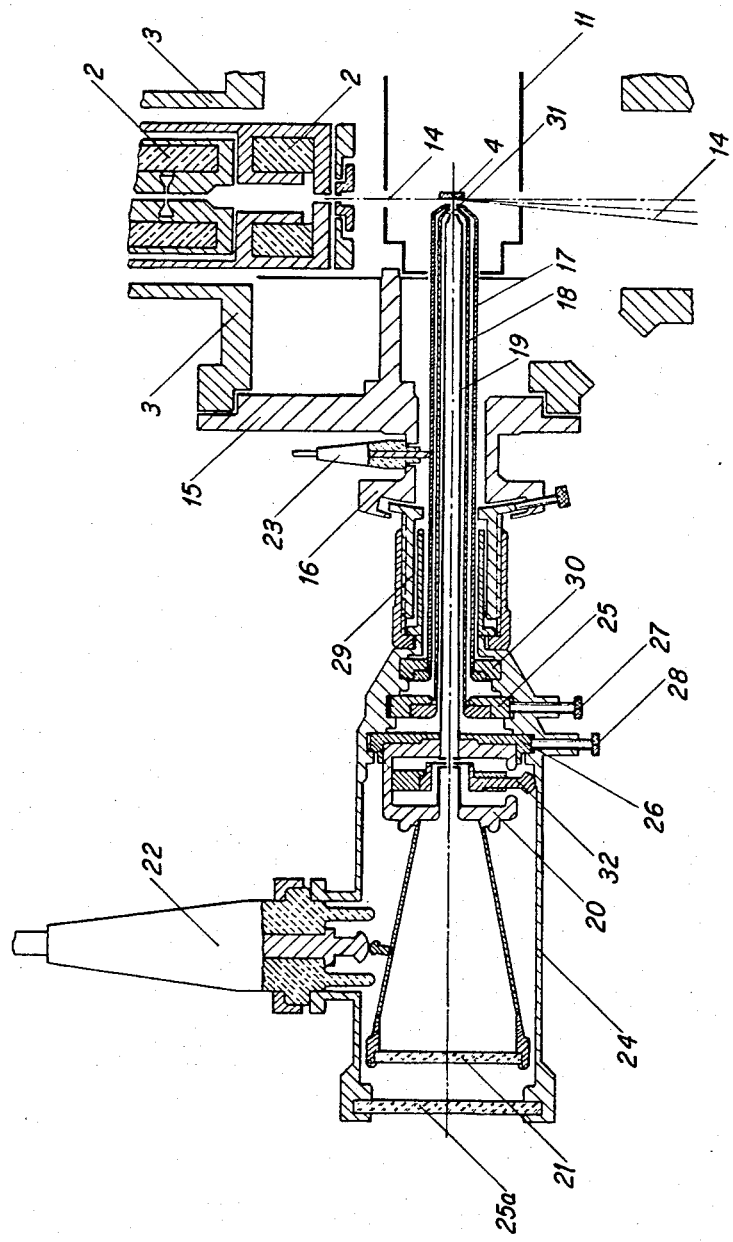

The nature of the invention will appear more clearly from the following description read in conjunction with the accompanying drawings which are given by way of example only and in which:

FIGURE 1 is a diagrammatic sectional view of a known electron diffraction apparatus, and FIGURE 2 is a diagrammatic sectional view of an electron emission microscope attached to a diffraction apparatus in accordance with the invention.

In the drawings FIGURE 1 represents a known electron diffraction apparatus which will therefore not be described in detail. The most important parts are: An electron emitter 1 with a high voltage supply 8, one or several condenser lenses indicated generally at 2, a vacuum-tight housing 3 containing a diffraction chamber which contains the object 4 under examination, a vacuum-tight diffraction chamber 5 with a window 6, a fluorescent screen and/or photoelectric device 7, for observation of the diffracted electrons, and an evacuating device with low pressure vacuum pump 9 and a backing pump 10.

It is also known, but not necessary for all observations to enclose the object 4 in a heatable cooling trap 11 with a coolant reservoir 12 and separate low pressure vacuum pump 13. The cooling trap 11 has apertures for the electron beam and for the use of other appliances, such as those for discharge by slow electrons, ion etching, vaporization and observation through a light microscope. Such further additions are known.

FIGURE 2 shows an exemplary embodiment of the invention corresponding parts being identified by the same references as in FIGURE 1.

Of the electron diffraction apparatus, part of the diffraction chamber housing 3 with the condenser lenses 2 is shown together with the cooled internal chamber 11 and the object 4. The object 4 is set in known manner on a heatable or coolable gonimeter head which permits translational and rotational movements in a vacuum, for example the adjustment of the diffraction angle to the electron beam which is situated in the axis 14 of the diffraction apparatus. A vacuum-tight centering head 16, which carries an electron emission microscope, is attached to a flange 15 on the diffraction chamber 3. The electron emission microscope comprises in known manner an electrostatic immersion objective having an electrode 17, anode 18 and anode screen 19, together with an electrostatic projective 20 and 32 and a fluorescent screen 21. The projective could alternatively be of the electromagnetic type.

The evacuated parts of the electron emission microscope communicate with the electron diffraction apparatus and are exhausted by the latter's vacuum unit. The whole unit consisting of the anode 18, anode screen 19, outer projective electrodes 20 or housing of the magnetic projective and fluorescent screen 21 is at a positive high voltage supplied by a conductor which enters the evacuated space through an insulating duct 22. The electrode 17 can be at the voltage of the housing 3 or at a high voltage or at a voltage that lies between these two voltages and is connected to the vacuum by means of the duct 23. The whole emission electron microscope is enclosed in a housing 24 with an inspection plate 25a, which permits safe operation and examination of the electron image by being connected conductively with the housing 3 of the electron diffraction apparatus, which is normally grounded.

The cross tables 25 or 26 necessary for centering the anode 18 and the anode screen 19 are made of insulating material so that centering can be carried out during operation by the grounded centering driving means 27 and 28. For the rough focusing of the image the whole emission electron microscope is moved towards or away from the object 4 by means of a grounded vacuum-tight displacement device 29. Precision focusing is effected in known manner by varying the electrode 17.

The centering device 16 is designed so that the emission microscope can execute a tilting motion about a center which is situated on the object 4 and therefore on the axis 14 of the diffraction apparatus. Thus the emission microscope can always be set perpendicular to the object surface even when the latter is slightly inclined for the purpose of the adjustment of the diffraction angle.

The displacement device 29 serves not only for the rough focusing of the image but also for withdrawing the emission microscope entirely out of the internal chamber 11 when it is necessary to use other attachments for the electron diffraction apparatus, such as an ion etching device, a light microscope or a temperature probe for the measurement of the surface temperature of the object. The electron emission microscope is advantageously mounted, together with such other attachments for the observation or influencing of the object surface, on the flange 15 which is in the form of a turntable that can be rotated under vacuum, when the mounted attachments come before the object in turn. The vacuum in the internal chamber then prevents contamination of the object surface. The centering device 16 and the displacement device 29 make the distance from the object 4 of the attachments of the electrodes 17 and 18 to the insulated supporting tables 30 and 25 respectively unusually large. As the electrodes must nevertheless extend to the immediate proximity of the object, a design is necessary in which the distance from the points of attachment to the insulated carrying tables 30 and 25 of the electrodes 17 and 18 respectively to the aperture 31 of the latter must be at least six times as great as the average diameter of the electrodes.

If an electrostatic projective is used, the outer electrodes 20 are advantageously at the same time high voltage as the anode, while the center electrode 32 is at the potential of the housing. In this case the center electrode 32 is advantageously connected directly to the housing 24.

I claim:

1. Apparatus for the electron-optical examination of an object, including an electron diffraction apparatus having a diffraction chamber housing within which the said object can be supported in a vacuum for examination by electron diffraction, and an electron emission microscope disposed for examination of the surface of said object and having an anode, and an anode screen in proximity of said object, a fluorescent screen remote from said object and a projective between said object and said fluorescent screen, said anode, anode screen, fluorescent screen and at least part of said projective being maintained at a high positive potential relative to said housing, a housing surrounding said emission microscope and electrically connected to said diffraction chamber housing, at least one viewing window in the emission microscope housing, and at least one insulated high-voltage duct penetrating said microscope housing for supplying said high potential.

2. Apparatus as claimed in claim 1, in which the said housing of the electron emission microscope is vacuum-tight and is connected to the vacuum chamber of the electron diffraction apparatus.

3. Apparatus as claimed in claim 1, in which said emission microscope has an electrode surrounding said anode and at least one carrier table insulated from said emission microscope housing, at least one of said anode and said electrode being attached to said carrier table.

4. Apparatus as claimed in claim 3, in which each said insulated carrier table is displaceable in at least two coordinate directions.

5. Apparatus as claimed in claim 3 in which said one of the anode and electrode attached to the carrier table has a circular cross section and a length as measured from its point of attachment to the insulated carrier table to the opposite end thereof which is at least six times as great as its average diameter.

6. Apparatus as claimed in claim 1, in which the said housing of the electron emission microscope contains a vacuum-tight displacement device by means of which the microscope can be displaced towards or away from the object surface.

7. Apparatus as claimed in claim 6, in which the electron diffraction apparatus contains a coolable internal chamber surrounding the said object, the electron emission microscope being withdrawable from the said internal chamber by means of the said displacement device without interrupting the vacuum.

8. Apparatus as claimed in claim 1, including a vacuum-tight centering device which can execute a tilting motion about a center situated on the axis of the electron diffraction, said emission microscope being supported by said centering device.

9. Apparatus as claimed in claim 1, including a turntable carrying said electron emission microscope and other attachments so that said microscope and the said other attachments can be brought before the object selectively.

10. Apparatus as claimed in claim 1, in which the projective is electrostatic and has a central electrode connected conductively to the said housing of the electron emission microscope.

References Cited

UNITED STATES PATENTS 2,281,325    4/1942    Ramo _____ 250—49.5
3,206,598    9/1965    Wegmann _____ 250—49.5

ARCHIE R. BORCHELT, *Primary Examiner.*

RALPH G. NILSON, *Examiner.*

A. L. BIRCH, *Assistant Examiner.*